US012639136B2

(12) United States Patent
Hebbar et al.

(10) Patent No.: US 12,639,136 B2
(45) Date of Patent: May 26, 2026

(54) USER INTERACTION EVENT STREAMING

(71) Applicant: Truist Bank, Charlotte, NC (US)

(72) Inventors: Nagaraja Hebbar, Atlanta, GA (US); Matthew Laine Donlan, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 598 days.

(21) Appl. No.: 18/072,576

(22) Filed: Nov. 30, 2022

(65) Prior Publication Data

US 2024/0176680 A1     May 30, 2024

(51) Int. Cl.
*G06F 9/54* (2006.01)

(52) U.S. Cl.
CPC .............. *G06F 9/542* (2013.01); *G06F 9/543* (2013.01)

(58) Field of Classification Search
CPC ....... G06F 9/542; G06F 9/543; G06Q 20/383; G06Q 20/4016; G06Q 20/40
See application file for complete search history.

(56) References Cited

U.S. PATENT DOCUMENTS

| | | | | |
|---|---|---|---|---|
| 11,983,768 B1* | 5/2024 | Goteti | .................... | G06Q 20/18 |
| 2014/0337225 A1* | 11/2014 | Van Heerden | ..... | G06Q 20/4016 |
| | | | | 705/44 |
| 2015/0026027 A1* | 1/2015 | Priess | .................... | G06Q 10/04 |
| | | | | 705/35 |
| 2022/0083877 A1* | 3/2022 | Tarsauliya | ........... | G06Q 20/389 |
| 2022/0383325 A1* | 12/2022 | Hoffman | ............ | G06Q 20/4018 |
| 2025/0094853 A1* | 3/2025 | Zhu | ........................ | G06Q 20/12 |

\* cited by examiner

*Primary Examiner* — Peng Ke
(74) *Attorney, Agent, or Firm* — Kilpatrick Townsend & Stockton LLP; Michael A. Springs, Esq.

(57) ABSTRACT

Interactive event streaming can be provided in real-time and selectively transmitted to data consumers based on a rules engine. For example, a computer-implemented method described herein can include receiving a plurality of interaction events from at least one processing application. The method can include modifying the plurality of interaction events to produce a plurality of secured interaction events, wherein personal information of at least one data publisher in each secured interaction event of the plurality of secured interaction events is obscured. The method can further include selecting, based at least in part on a rules engine, at least one particular interaction event from the plurality of secured interaction events. Additionally, the method can include notifying a data consumer of the at least one particular interaction event from the plurality of secured interaction events.

16 Claims, 4 Drawing Sheets

400

Receive a Plurality of Interaction Events from at Least One Interaction Event Processing Application
410

Modify the Plurality of Interaction Events to Produce a Plurality of Secured Interaction Events
420

Storing the Plurality of Secured Interaction Events in an Event Store
430

Separating, Based on the at Least One Processing Application, the Plurality of Secured Interaction Events into a Plurality of Real-Time Event Rails
440

Sharing the Plurality of Real-Time Event Rails with at Least One Adaptor
450

Selecting, Based at Least in Part on a Rules Engine, at Least One Particular Interaction Event from the Plurality of Secured Interaction Events
460

Notify a Data Consumer of at Least One Particular Interaction Event from the Plurality of Secured Interaction Events
470

400

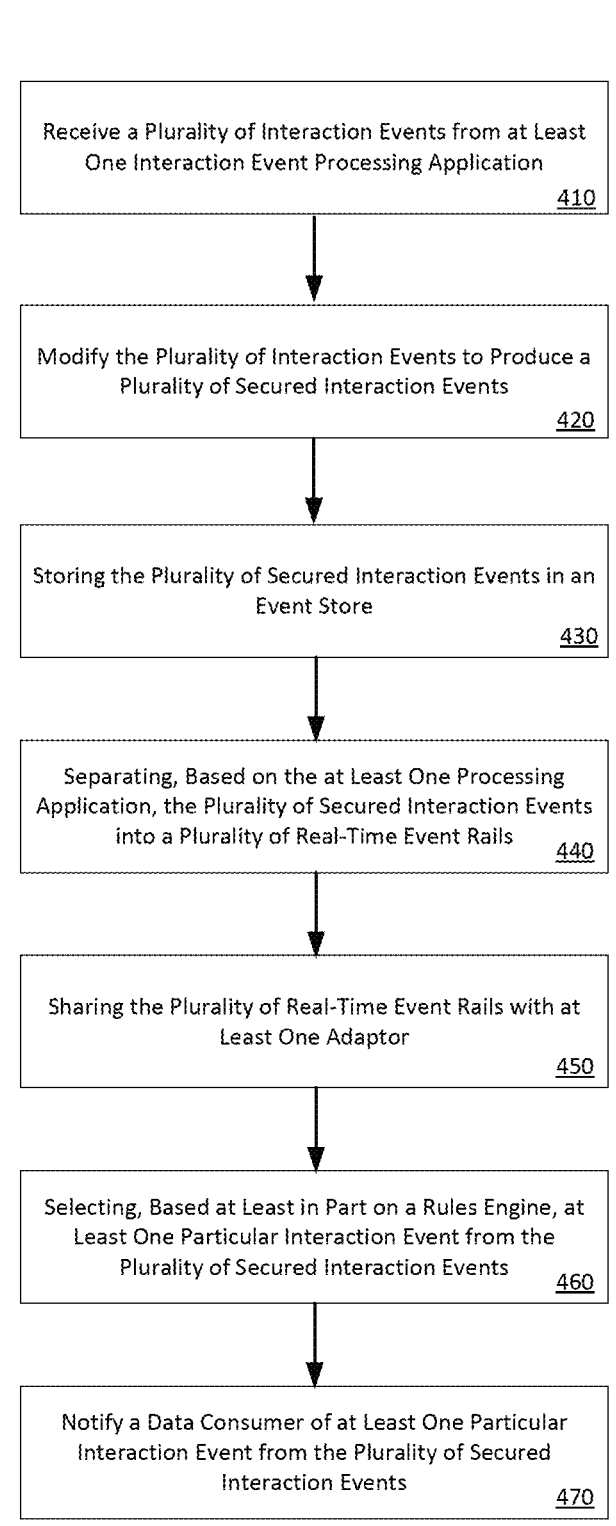

Receive a Plurality of Interaction Events from at Least One Interaction Event Processing Application

410

Modify the Plurality of Interaction Events to Produce a Plurality of Secured Interaction Events

420

Storing the Plurality of Secured Interaction Events in an Event Store

430

Separating, Based on the at Least One Processing Application, the Plurality of Secured Interaction Events into a Plurality of Real-Time Event Rails

440

Sharing the Plurality of Real-Time Event Rails with at Least One Adaptor

450

Selecting, Based at Least in Part on a Rules Engine, at Least One Particular Interaction Event from the Plurality of Secured Interaction Events

460

Notify a Data Consumer of at Least One Particular Interaction Event from the Plurality of Secured Interaction Events

USER INTERACTION EVENT STREAMING

TECHNICAL FIELD

The present disclosure relates generally to interaction event streaming and, more particularly (although not necessarily exclusively), to selecting a particular interaction event to highlight for an end user.

BACKGROUND

The public is increasingly accessing webpages and other on-line portals to initiate various interaction events in addition to interaction events that occur in person. Interaction events can be processed at any hour of a day and can include parties that are separated by great distances. Several different processing applications can process the interaction events. Each interaction event can include an event status. When the event status changes, each of the different processing applications can notify a data consumer of the event status change in a different manner than other processing applications. The notification may arrive after a delay and may lack important details. Data consumers can appreciate receiving up-to-the minute information regarding a status of interaction events even after a close of regular business hours.

SUMMARY

Interactive Event Streaming can be provided in real-time and selectively transmitted to data consumers. For example, a computer-implemented method described herein can include receiving a plurality of interaction events from at least one processing application. The computer-implemented method can include modifying the plurality of interaction events to produce a plurality of secured interaction events, wherein personal information of at least one data publisher in each secured interactive event of the plurality of secured interaction events is obscured. Additionally, the computer-implemented method can include selecting, based at least in part on a rules engine, at least one particular interaction event from the plurality of secured interaction events. The computer-implemented method can further include notifying a data consumer of the at least one particular interaction event from the plurality of secured interaction events.

In another example, a system described herein can include a plurality of adaptors configured to select, based at least in part on a rules engine, at least one particular event from a plurality of secured interaction events and to notify a data consumer of the at least one particular interaction event. The system can include an event store configured to provide the plurality of secured interaction events to the plurality of adaptors in a real-time event stream. The event store can include a processor and a memory. The memory can include instructions executable by the processor for causing the processor to perform operations. The operations can include receiving a plurality of interaction events from at least one processing application. Additionally, the operations can include modifying the plurality of interaction events to produce the plurality of secured interaction events, wherein personal information of at least one publisher in each secured interaction event of the plurality of secured interaction events is obscured.

In an example, a non-transitory computer-readable medium includes instructions that are executable by a processor for causing the processor to perform operations. The operations can include receiving a plurality of interaction events from at least one processing application. Additionally, the operations can include modifying the plurality of interaction events to produce the plurality of secured interaction events, wherein personal information of at least one publisher in each secured interaction event of the plurality of secured interaction events is obscured. Additionally, the operations can include selecting, based at least in part on a rules engine, at least one particular interaction event from the plurality of secured interaction events. The operations can further include notifying a data consumer of the at least one particular interaction event of the plurality of secured interaction events.

BRIEF DESCRIPTION OF THE DRAWINGS

FIG. 4 is a flow chart of a process for providing interactive event streaming according to one example of the present disclosure.

DETAILED DESCRIPTION

Interactive event streaming can be provided in real-time and selectively transmitted to data consumers based on a rules engine. The interactive events can be generated by a plurality of processing applications. An event store can receive the interactive events, modify the interactive events to obscure personal information of an event publisher, and separate the interactive events into a plurality of real-time event rails. The real-time event rails can be real-time data streams provided by the event store. Each real-time event rail can include interactive events associated with a particular process application. For example, a centralized payment system (CPS) event rail can include a real-time stream of interaction events processed by a CPS processing application. A rules engine can be applied to the real-time event rail to select at least one particular interaction event from the real-time event rails. In some examples, the real-time event rails can be shared with adaptors that can apply the rules engine to select at least one particular interaction event from the real-time event rails. The adaptors can use the rules engine to monitor the real-time event rails and only select particular interaction events or particular event status changes that may be relevant to the data consumer. The data consumer can be notified of the at least one particular interaction event.

Data consumers can subscribe to the event store to receive notifications via at least one of the adaptors. Each interactive event can include key information that can allow the event store or the adaptors to efficiently apply rules engines in real-time. In some examples, the event store can preprocess the interactive events to ensure that the interactive events share a format and include event details that data consumers may consider important. The real-time event rails provided by the event store can automatically inform data consumers of a change of event status of the at least one particular event. The notification can occur at any time of day including a time of day outside of conventional local business hours for data consumers.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
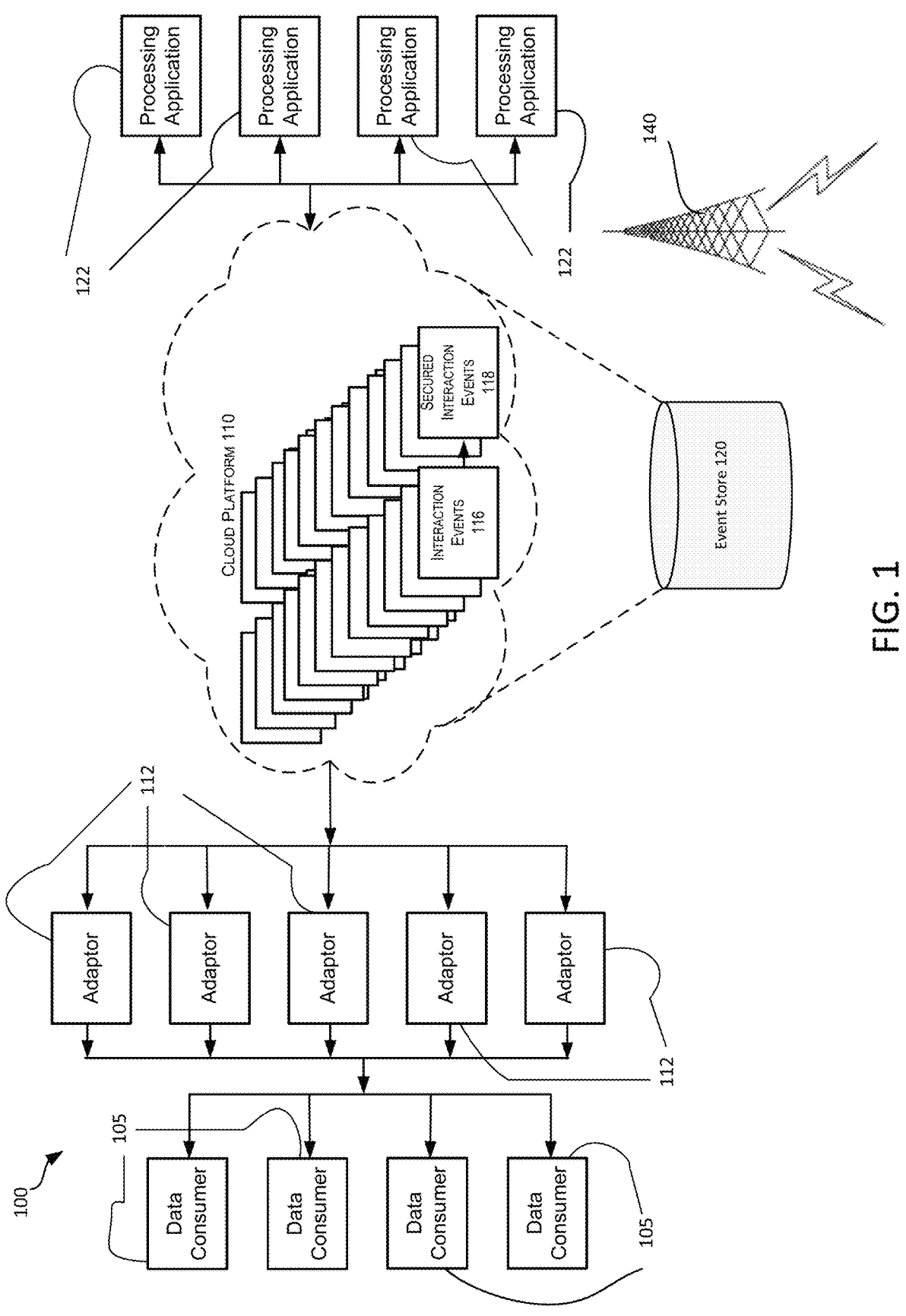
FIG. 1 is a schematic of an interactive event streaming environment according to one example of the present disclosure.

FIG. 1 is a schematic of an interactive event streaming environment 100 according to one example of the present disclosure. The interactive event streaming environment 100 can include processing applications 122, an event store 120, adaptors 112, one or more communication networks 140, and data consumers 105. The event store 120 can include a cloud platform 110.

Each processing application of the processing applications 122 and each adaptor of the adaptors 112 can send or receive communication with the event store 120 over the one or more communication networks 140. Additionally, each adaptor can send or receive communication with each data consumer of the data consumers 105. The one or more communication networks 140 may correspond to one or more Wide Area Networks ("WANs"), such as the Internet, through which the event store 120, each adaptor, each processing application, and each data consumer may communicate with servers via web browsers or client-side applications, to establish communication sessions, request and receive web-based resources, and access other features of applications or services.

Each processing application 122 can generate an interaction event 116 and submit the interaction event 116 to the event store 120. Each interaction event 116 can include key information, event details, and an event state. Event details can include a date and time of completion associated with the interaction event, at least one account associated with the interaction event, an interaction event category, names of parties included in the interaction event, interaction event data, etc. Each interaction event 116 can be associated with a data publisher that generated the interaction event 116. In some examples, the interaction event can be generated in real-time by a processing application. In other examples, a plurality of interaction events 116 as daily batch files can be generated at the end of a day. The daily batch files can include information associated with future interaction events, such as a scheduled date of completion for a future interaction event. For example, the future interaction events can include future payments with a predetermined future processing date. The daily batch files can include any event status changes of the future payments. For instance, when the predetermined future processing date falls on a holiday in a particular month, the future processing date can be changed to a next business day that occurs after the holiday. In some examples, the interaction event 116 can be generated as a real-time event update to a previous interaction event due to a change in the event state.

The event store 120 can receive a plurality of interaction events 116 from the processing applications 122. The plurality of interaction events 116 can be stored in a memory of the event store 120 and purged from the memory after a predetermined amount of time elapses. In some examples, the event store 120 can preprocess the plurality of interaction events 116. For example, the event store 120 can modify the plurality of interaction events 116 to produce a plurality of secured interaction events 118. Personal information of at least one data publisher in each secured interaction event of the plurality of secured interaction events 118 can be obscured while maintaining event details, the event state, and the key information. The event store 120 can make the plurality of secured interaction events 118 available to the adaptors 112 or the data consumers 105 via the cloud platform 110.

The data consumers 105 can subscribe to the event store 120 to receive information regarding the secured interaction events 118 from the event store 120 via the adaptors 112. Each adaptor of the adaptors 112 can select, based at least in part on a rules engine, at least one particular interaction event from the plurality of secured interaction events. The rules engine can be based at least in part on an interaction event category, names of parties included in an interaction event, the at least one processing application that generated the interaction event, a flag included in the interaction event, dates associated with the interaction event, or a comparison of interaction event data with a threshold value. For example, each adaptor can monitor a real-time stream of the secured interaction events 118 in the cloud platform 110 while applying the rules engine. As an example, the rules engine can filter the secured interaction events 118 and select only the interaction events that have been processed within a certain week and include a particular name of a third-party vendor. Each adaptor can notify a data consumer of the selected interaction events. For example, an adaptor can send the data consumer a text in real-time of a processed interaction event based at least in part on the rules engine.

Figure 2:
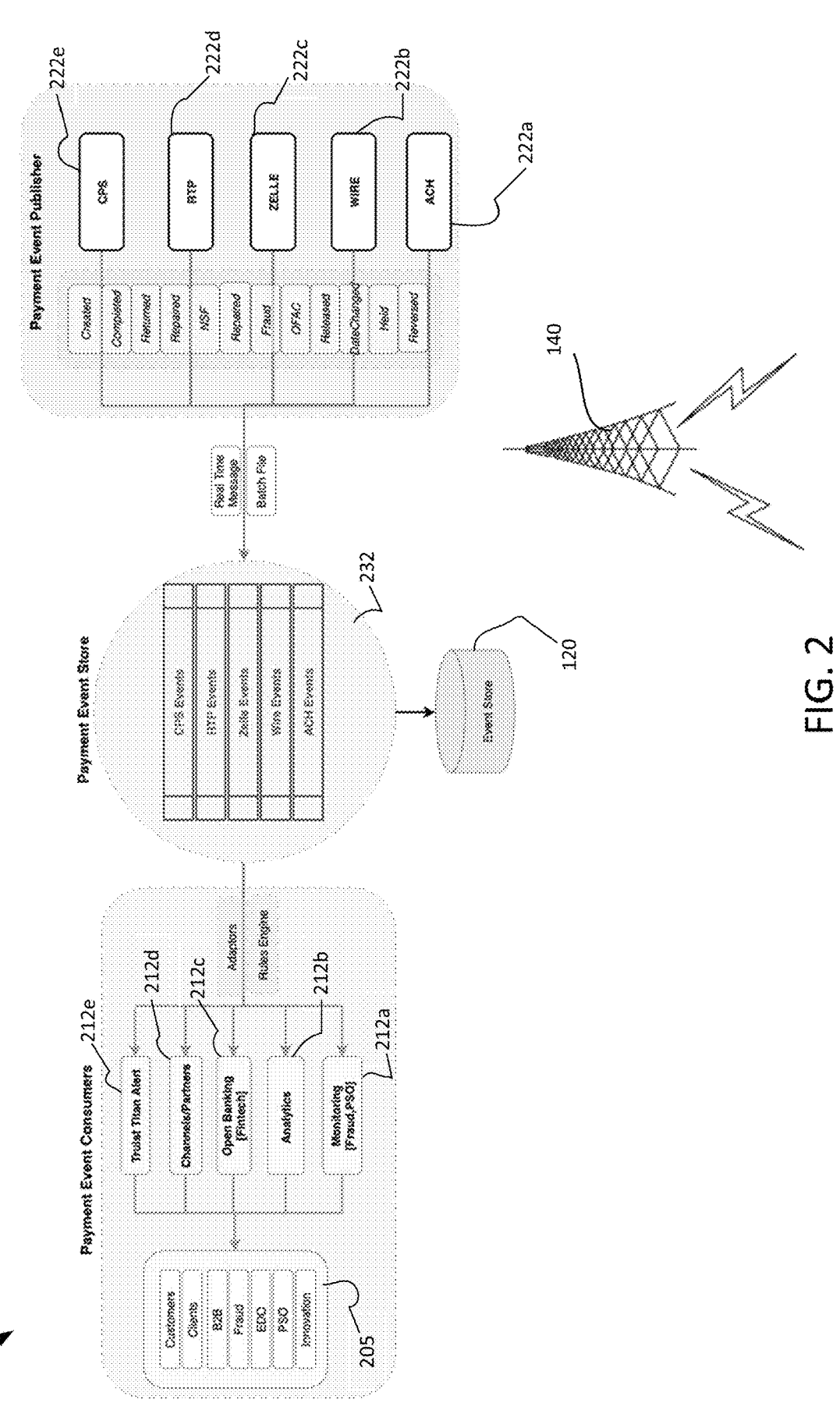
FIG. 2 is a diagram that includes additional details about an interactive event streaming environment according to one example of the present disclosure.

FIG. 2 is a diagram that includes additional details about an interactive event streaming environment 200 according to one example of the present disclosure. The interactive event streaming environment 200 can include processing applications 222 (e.g., 222a, 222b, 222c, 222d, and 222e), an event store 120, adaptors 212 (e.g., 212a, 212b, 212c, 212d, and 212e), one or more communication networks 140, and data consumers 205.

The processing applications 222 can include an automated clearing house (ACH) processing application 222a, a wire transfer payment processing application 222b, a Zelle processing application 222c, a real-time payment (RTP) processing application 222d, and a CPS processing application 222e. Although five processing applications 222 are shown in FIG. 2, other examples of the interactive event streaming environment 200 can include more than five or less than five processing applications 222.

The adaptors 212 can include a monitoring adaptor 212a (e.g., a fraud monitor adaptor or a private security officer (PSO) adaptor), an analytics adaptor 212b, an open banking adaptor 212c (such as a financial technology adaptor), a delivery channel (e.g., an ATM, a point-of-sale device) adaptor 212d, and a security system alert adaptor, such as a Truist Titan alert adaptor 212e. The data consumers 205 can include customers, clients, business-to-business (B2B) services, fraud services, risk monitoring services (e.g., estimated dynamic optimization (EDO) model-based service), PSO services, and innovation services.

The processing applications 222a-e and the adaptors 212a-e can communicate with the event store 120 over the one or more communication networks 140. Additionally, each adaptor can send or receive communication with each data consumer of the data consumers 105. The one or more communication networks 140 may correspond to one or more Wide Area Networks ("WANs"), such as the Internet, through which the event store 120, each adaptor, each processing application, and each data consumer may communicate with servers via web browsers or client-side applications, to establish communication sessions, request and receive web-based resources, and access other features of applications or services.

Each processing application can generate an interaction event and submit the interaction event to the event store 120. Each interaction event can include key information, event details, and an event state. Event details can include a date and time of creation or completion associated with the interaction event, at least one account associated with the interaction event, an interaction event category, names of parties included in the interaction event, interaction event data, etc. The key information can include a name of the data publisher that processed the interaction event. In some examples, the key information can include a summary of the event details. Examples of the event state can include a creation state, a completion state, a returned state (notice that the interaction event could not be completed), a repaired returned state, a non-sufficient funds (NSF) state, a repaired NSF state, a fraud state, a flagged state (for instance, an interaction event that has been denied by Office of Foreign Assets Control (OFAC), a held state, a release state, an edited state (such as an interaction event where a date of completion has been corrected), or a reversed state (such as a payment interaction event that has been refunded). Other relevant information can also be included in the interaction event.

Each interaction event can be associated with one of the processing applications 222a-e. In some examples, the interaction event can be generated in real-time by one of the processing applications 222a-e. In other examples, a plurality of interaction events 116 can be generated as daily batch files at the end of a day. The daily batch files can include information associated with future interaction events, such as a scheduled date of completion for a future interaction event. In some examples, the interaction event can be generated as an update to a previous interaction event due to an event state change.

The event store 120 can receive a plurality of interaction events 116 from the processing applications 222a-e. In some examples, the event store 120 can preprocess the plurality of interaction events 116. For example, the event store 120 can modify the plurality of interaction events 116 to produce a plurality of secured interaction events 118. Personal information of at least one data publisher in each secured interaction event of the plurality of secured interaction events can be obscured. In some examples, the event store 120 can preprocess the plurality of interaction events 116 so that each interaction event shares a similar format. In some examples, the event store 120 can separate event streams of the plurality of secured interaction events 118 into real-time event rails 232. Each real-time event rail can be associated with a source processing application. For example, an RTP real-time event rail can include secured interaction events that were generated by the RTP processing application 222d.

The event store 120 can make the plurality of secured interaction events 118 available to the adaptors 212a-e or the data consumers 205 via a cloud platform. The data consumers 205 can subscribe to the event store 120 to receive information regarding the secured interaction events 118 within the real-time event rails 232 from the event store 120 via the adaptors 112. Each adaptor of the adaptors 112 can select, based at least in part on a rules engine, at least one particular interaction event from the plurality of secured interaction events. For example, each adaptor can monitor a real-time stream of the secured interaction events 118 in the cloud platform 110 while applying the rules engine. As an example, the rules engine can filter the secured interaction events 118 and select only the interaction events that have been processed within a certain week and include a particular name of a third-party vendor. Each adaptor can notify a data consumer of the selected interaction events. For example, an adaptor can notify the data consumer by communicating with a computing device of the data consumer. For instance, the adaptor can send the data consumer a text in real-time of a processed interaction event based at least in part on the rules engine.

Figure 3:
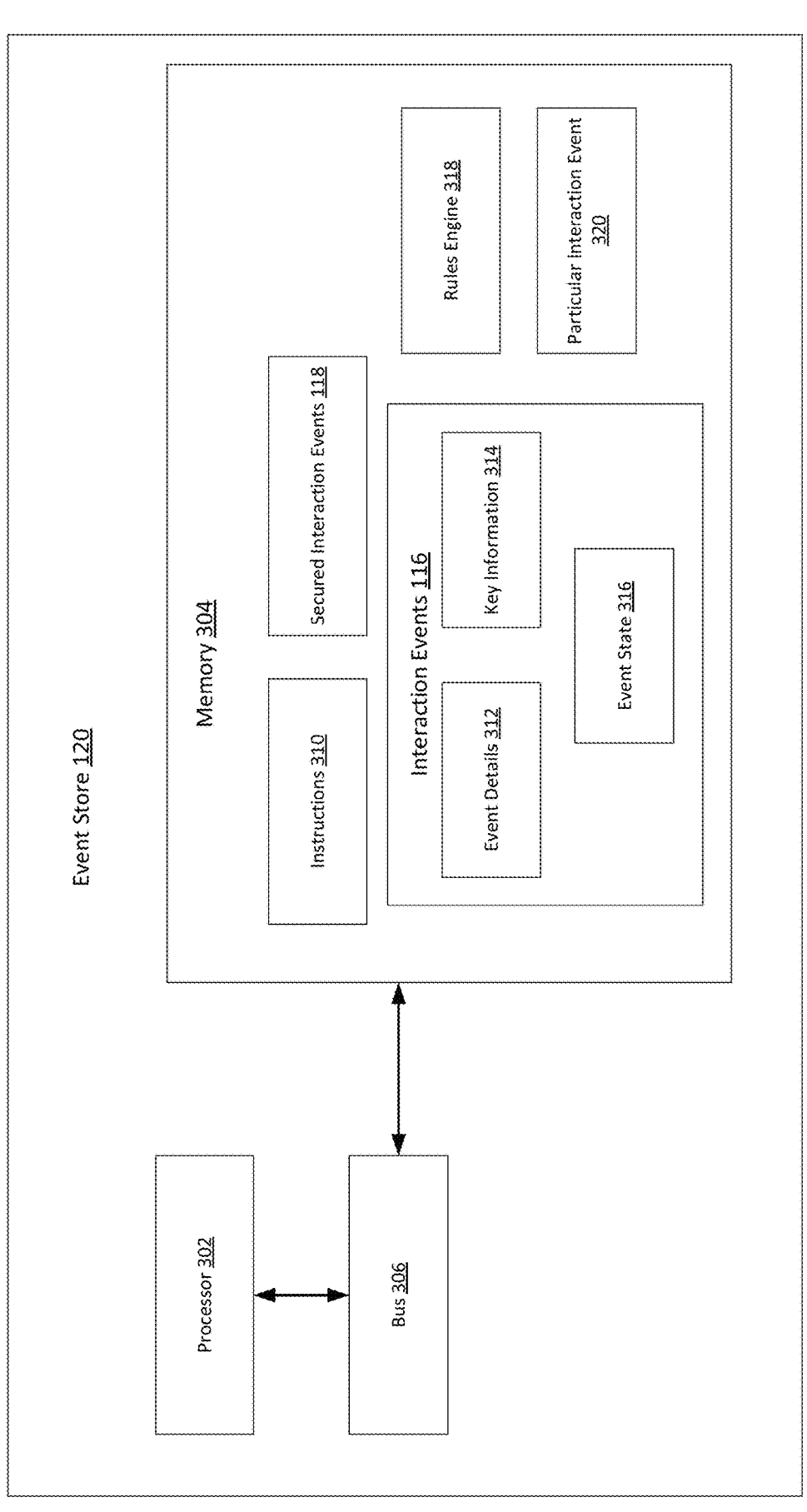
FIG. 3 is a block diagram of an event store for providing interactive event streaming according to one example of the present disclosure.

FIG. 3 is a block diagram of an event store 120 for providing interactive event searches according to one example of the present disclosure. The components shown in FIG. 3, such as a processor 302, a memory 304, a bus 306, and the like, may be integrated into a single structure such as within the single housing of the event store 120. Alternatively, the components shown in FIG. 3 can be distributed from one another and in electrical communication with each other.

As shown, the event store 120 includes the processor 302 communicatively coupled to the memory 304 by the bus 306. The processor 302 can include one processor or multiple processors. Non-limiting examples of the processor 302 include a Field-Programmable Gate Array (FPGA), an application specific integrated circuit (ASIC), a microprocessor, or any combination of these. The processor 302 can execute instructions 310 stored in the memory 304 to perform operations. In some examples, the instructions 310 can include processor-specific instructions generated by a compiler or an interpreter from code written in any suitable computer-programming language, such as C, C++, C#, or Java.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 310. The non-transitory computer-readable medium can include electronic, optical, magnetic, or other storage devices capable of providing the processor 302 with the instructions 310 or other program code. Non-limiting examples of the non-transitory computer-readable medium include magnetic disk(s), memory chip(s), RAM, an ASIC, or any other medium from which a computer processor can read instructions 310.

The memory can further include interaction events 116 and secured interaction events 118. Each interaction event of the interaction events 116 can include event details 312, key information 314, and an event state 316. Examples of the event state 316 include a creation state, a completion state, a returned state (notice that the interaction event could not be completed), a repaired returned state, an non-sufficient funds (NSF) state, a repaired NSF state, a fraud state, a flagged state (for instance, an interaction event that has been denied by Office of Foreign Assets Control (OFAC), a held state, a release state, an edited state (such as an interaction event where a date of completion has been corrected), or a reversed state (such as a payment interaction event that has been refunded). Other states can also be included as part of the event state 316.

The event details 312 can include a date and time of completion associated with the interaction event, at least one account associated with the interaction event, an interaction event category, names of parties included in the interaction event, interaction event data, etc. The key information 314 can include a name of the data publisher that processed the interaction event. In some examples, the key information 314 can include a summary of the event details 312.

The processor 302 can modify the interaction events 116 to produce the secured interaction events 118. Each secured interaction event can retain the event details 312, the key information 314, and the event state 316 of a corresponding interaction event. Each secured interaction event can be identical to the corresponding interaction event except that personal information of at least one date publisher in each secured interaction event is obscured. The processor can apply a rules engine 318 to the secured interaction events 118 to select at least one particular interaction event 320. A data consumer can be notified of the at least one particular interaction event 320.

In some examples, the event store 120 can implement the process shown in FIG. 4 for effectuating some aspects of the present disclosure. Other examples can involve more operations, fewer operations, different operations, or a different order of the operations shown in FIG. 4.

FIG. 4 is a flow chart of a process 400 for providing interactive event streaming according to one example of the present disclosure. Operations of methods may be performed by software, firmware, hardware, or a combination thereof. The operations of the process 400 start at block 410.

At block 410, the process 400 involves receiving a plurality of interaction events 116 from at least one interaction event processing application. Each interaction event of the plurality of interaction events 116 can include event details 312, key information 314, and an event state 316. In some examples, the key information 314 can include a summary of the event details 312.

In some examples, the plurality of interaction events can be generated in real-time by the at least one interaction event processing application. In other examples, a plurality of interaction events 116 can be generated as daily batch files at the end of a day. The daily batch files can include information related to future interaction events, such as a scheduled date of completion for a future interaction event. In some examples, the interaction event can be generated as an update to a previous interaction event due to a change in an event state 316.

At block 420, the process 400 involves modifying the plurality of interaction events 116 to produce a plurality of secured interaction events 118. Each secured interaction event can retain the event details 312, the key information 314, and the event state 316 of a corresponding interaction event. Each secured interaction event can be identical to the corresponding interaction event except that personal information of at least one date publisher in each secured interaction event is obscured. In some examples, the plurality of interaction events 116 can be preprocessed before the modification. For instance, the plurality of interaction events 116 can be preprocessed so that each interaction event shares a similar format.

At block 430, the process 400 involves storing the plurality of secured interaction events 118 in an event store 120. In some examples, the key information 314 of each secured interaction event can be updated to include a batch ID used to locate the secured interaction event within a memory 304 of the event store 120. A portion of the secured interaction events 118 can be purged from the memory 304 after a predetermined amount of time has elapsed.

At block 440, the process 400 involves separating, based on the at least one processing application, the plurality of secured interaction events into a plurality of real-time event rails 232. Each real-time event rail can be associated with a source processing application. For example, an RTP real-time event rail can include secured interaction events that were generated by an RTP processing application 222*d*.

At block 450, the process 400 involves sharing the plurality of real-time event rails 232 with at least one adaptor. The at least one adaptor can subscribe to the event store 120. In some examples, data consumers 105 can subscribe to the event store 120 via the at least one adaptor.

At block 460, the process 400 involves selecting, based at least in part on a rules engine, at least one particular interaction event from the plurality of secured interaction events 118. The rules engine can be based at least in part on an interaction event category, names of parties included in an interaction event, the at least one processing application that generated the interaction event, a flag included in the interaction event, dates associated with the interaction event, or a comparison of interaction event data with a threshold value. In some examples, the at least one adaptor can monitor only the key information 314 of the plurality of secured interaction events 118 to increase the speed of the selection process.

At block 470, the process 400 involves notifying a data consumer of the at least one particular interaction event from the plurality of secured interaction events 118. The data consumer can be notified of the at least one particular interaction event at a same time that the at least one particular interaction event is selected. For example, an adaptor can send the data consumer a text in real-time of a processed interaction event based at least in part on the rules engine.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computer-implemented method for secure, real-time event streaming comprising:

receiving, over a communication network and at an event store having a processor and a memory, a plurality of interaction events from at least one processing application, wherein each interaction event comprises event details, key information, and an event state associated with a source processing application;

preprocessing the plurality of interaction events to ensure a uniform event format and to include event details used in downstream processing;

modifying the plurality of interaction events to produce a plurality of secured interaction events, wherein the modifying includes obscuring personal information of at least one data publisher in each secured interaction event, and wherein the secured interaction events retain event details, event state, and key information used in event processing;

storing the plurality of secured interaction events in the event store;

separating, based on the source processing application, the plurality of secured interaction events into a plurality of real-time event rails, each event rail comprising events from a specific processing application;

sharing the plurality of real-time event rails with at least one adaptor communicatively coupled to the event store;

selecting, based at least in part on a rules engine executed by the event store, at least one particular interaction event from the plurality of secured interaction events of the plurality of real-time event rails, wherein the rules engine comprises executable instructions that filter events according to an interaction event category, names of parties, source application, flags, or threshold values, and wherein the selection occurs in real time as of the plurality of secured interaction events are received; and transmitting, via the at least one adaptor communicatively coupled to the event store, an indication of the at least one particular interaction event to a data consumer as a real-time event notification, wherein the notification is transmitted by text message to a registered device of the data consumer, and wherein the notification comprises selected event details and metadata.

2. The computer-implemented method of claim 1, wherein the plurality of interaction events comprises a real-time event update generated due to an event state change by the at least one processing application.

3. The computer-implemented method of claim 1, further comprising:

storing the plurality of secured interaction events in the event store; and associating each secured interaction event with a batch identifier and a source application identifier for efficient retrieval.

4. The computer-implemented method of claim 1, further comprising purging a portion of the secured interaction events from the event store after a predetermined amount of time has elapsed.

5. The computer-implemented method of claim 1, wherein the plurality of interaction events comprises daily batch files comprising information related to future interaction events.

6. The computer-implemented method of claim 1, wherein the at least one processing application comprises at least one of a centralized payment system (CPS) processing application, a real-time payment (RTP) processing application, a Zelle processing application, an automated clearing house (ACH) processing application, or a wire transfer payment processing application.

7. A system comprising:

a processor; and a memory that includes instructions executable by the processor for causing the processor to perform operations comprising:

receiving, over a communication network and at an event store having a processor and a memory, a plurality of interaction events from at least one processing application, wherein each interaction event comprises event details, key information, and an event state associated with a source processing application;

preprocessing the plurality of interaction events to ensure a uniform event format and to include event details used in downstream processing;

modifying the plurality of interaction events to produce a plurality of secured interaction events, wherein the modifying includes obscuring personal information of at least one data publisher in each secured interaction event, and wherein the secured interaction events retain event details, event state, and key information used in event processing;

storing the plurality of secured interaction events in the event store;

separating, based on the source processing application, the plurality of secured interaction events into a plurality of real-time event rails, each event rail comprising events from a specific processing application;

sharing the plurality of real-time event rails with at least one adaptor communicatively coupled to the event store;

selecting, based at least in part on a rules engine executed by the event store, at least one particular interaction event from the plurality of secured interaction events of the plurality of real-time event rails, wherein the rules engine comprises executable instructions that filter events according to an interaction event category, names of parties, source application, flags, or threshold values, and wherein the selection occurs in real time as the plurality of secured interaction events are received; and transmitting, via the at least one adaptor communicatively coupled to the event store, an indication of the at least one particular interaction event to a data consumer as a real-time event notification, wherein the notification is transmitted by text message to a registered device of the data consumer, and wherein the notification comprises selected event details and metadata.

8. The system of claim 7, wherein the plurality of interaction events comprises a real-time event update generated due to an event state change by the at least one processing application.

9. The system of claim 7, wherein the operations further comprise purging a portion of the secured interaction events from the memory after a predetermined amount of time has elapsed.

10. The system of claim 7, wherein the plurality of interaction events comprises daily batch files comprising information related to future interaction events.

11. The system of claim 7, wherein the at least one processing application comprises at least one of a centralized payment system (CPS) processing application, a real-time payment (RTP) processing application, a Zelle processing application, an automated clearing house (ACH) processing application, or a wire transfer payment processing application.

12. A non-transitory computer-readable medium comprising instructions that are executable by a processor for causing the processor to perform operations comprising:

receiving, over a communication network and at an event store, a plurality of interaction events from at least one processing application, wherein each interaction event comprises event details, key information, and an event state associated with a source processing application;

preprocessing the plurality of interaction events to ensure a uniform event format and to include event details used in downstream processing;

modifying the plurality of interaction events to produce a plurality of secured interaction events, wherein the modifying includes obscuring personal information of at least one data publisher in each secured interaction event, and wherein the secured interaction events retain event details, event state, and key information used in event processing;

storing the plurality of secured interaction events in the event store;

separating, based on the source processing application, the plurality of secured interaction events into a plurality of real-time event rails, each event rail comprising events from a specific processing application;

sharing the plurality of real-time event rails with at least one adaptor communicatively coupled to the event store;

selecting, based at least in part on a rules engine executed by the event store, at least one particular interaction event from the plurality of secured interaction events of the plurality of real-time event rails, wherein the rules engine comprises executable instructions that filter events according to an interaction event category, names of parties, source application, flags, or threshold values, and wherein the selection occurs in real time as the plurality of secured interaction events are received; and transmitting, via the at least one adaptor communicatively coupled to the event store, an indication of the at least one particular interaction event to a data consumer as a real-time event notification, wherein the notification is transmitted by text message to a registered device of the data consumer, and wherein the notification comprises selected event details and metadata.

13. The non-transitory computer-readable medium of claim 12, wherein the plurality of interaction events comprises a real-time event update generated due to an event state change by the at least one processing application.

14. The non-transitory computer-readable medium of claim 12, wherein the operations further comprise purging a portion of the plurality of secured interaction events from the event store after a predetermined amount of time has elapsed.

15. The non-transitory computer-readable medium of claim 12, wherein the plurality of interaction events comprises daily batch files comprising information related to future interaction events.

16. The non-transitory computer-readable medium of claim 12, wherein the at least one processing application comprises at least one of a centralized payment system (CPS) processing application, a real-time payment (RTP) processing application, a Zelle processing application, an automated clearing house (ACH) processing application, or a wire transfer payment processing application.

\* \* \* \* \*